Aug. 1, 1967  G. BOJNER  3,333,837
DEVICE IN ROTATABLE DRUMS FOR SUSPENDING CHAIN
SYSTEMS FOR HEAT EXCHANGE
Filed April 28, 1965

United States Patent Office 3,333,837
Patented Aug. 1, 1967

3,333,837
DEVICE IN ROTATABLE DRUMS FOR SUSPENDING CHAIN SYSTEMS FOR HEAT EXCHANGE
Gustav Bojner, Sveavagen 28–30,
Stockholm, Sweden
Filed Apr. 28, 1965, Ser. No. 451,530
Claims priority, application Sweden, Jan. 28, 1965,
1,158/65
6 Claims. (Cl. 263—33)

ABSTRACT OF THE DISCLOSURE

This invention is directed to an apparatus for the treatment of material and is particularly adaptable for employment in an embodiment comprising a rotary kiln. This apparatus includes a rotatable drum which defines an interior chamber through which said materials are passed, and a cage structure therein to prevent the accumulation of material in the chamber and to improve heat exchange therein.

---

The invention relates to rotary drums for apparatus of the class consisting of kilns and similar apparatus for drying, cooling, condensing and washing materials or gases.

In rotary kilns for treating solid materials in pulverized state or fluid materials and the like, for instance kilns for the production of cement or kilns for converting calcium carbonate mud (obtained from the sulphate pulping process) into lime, generally heat exchange systems are provided for heat exchange between the escaping gases which still are relatively warm, and the material supplied. This material often can be a fluid sludge or have a more thick or solid consistency and be of rather sticky nature so that it adheres firmly to the envelope wall of the kiln and to the means constituting the heat exchanger.

Frequently, a so-called chain system is used as heat exchanger. Such chain systems comprise a great number of flexible supple chains which have one or both ends attached to the envelope wall of the drum of the kiln. During the rotation of the kiln, said chains will form a great number of "curtains" or "veils" over the cross-section of the drum, but as the rotation of the kiln proceeds they will progressively be lying on the bottom of the envelope wall and will slide on the same, aiding in advancing the material through the kiln. At the same time the advanced material will form coatings or crusts on the chain links.

Thus, the heat transfer will be effected in the following way. The chains together with the coatings of the material are heated by the axially flowing gas, when they are depending in the free space of the drum, whereas they are cooled during the further revolution, when they on the bottom of the drum slide in contact with the wet materials supplied.

The difficulties encountered in the utilization of the described chain systems as heat exchangers, consist substantially therein that the material to be treated, whether of solid, thick or fluid nature, will adhere to the envelope wall in spite of the fact that the chains slide over the same. If such a sticking of material to the envelope wall would begin on a small scale, perhaps on account of a temporary occurrence, it rapidly increases in thickness and usually the chains are embedded in the coatings or crusts so that the operation will have to be interrupted for cleaning the kiln.

The primary object of the invention is to create an improved device for the suspension of the chains so as to prevent sticking of material onto the envelope wall of the drum. Another object of the invention is to improve the heat exchange by imparting turbulence to the gas flowing through the drum.

The device according to the invention consists therein that the chains are suspended or fastened in a cage, which is provided for a free rolling motion within the drum. This cage rotates together with the drum and is driven circumferentially on account of the friction against the same. Important is that this cage has smaller diameter than the inner diameter of the drum, viz a smaller rolling diameter. The result of this is that the device or cage will rotate or roll slightly more than one revolution for each revolution of the drum. Thus, the points or lines of contact between the rolling cage and the rotating envelope wall of the drum and thereby the suspension points of the chains are constantly displaced in relation to the envelope wall of the drum so that sticking of the materials to the envelope wall and to the chains is prevented.

The rolling cage can be of different structure and the suspension of the chains therein can be effected in different ways. There are in particular two important conditions that should be considered. During the rotation, the chains should together form such close "veils" that they impart turbulence to the flowing hot gas and thereby secure an effective exchange of heat. Moreover, they should be suspended such that they do not get entangled to each other or in the cage in which they are carried according to the present invention.

Further objects and features of the invention will be apparent from the following specification, when read in conjunction with the accompanying drawing, in which two embodiments of the invention in connection with a rotary kiln are illustrated and in which.

The envelope wall of the rotating drum of the kiln which generally is slightly inclined, is designated by 1. Means for mounting and driving the rotating drum or kiln, means for supplying and discharging the materials to be treated, and means for the admittance and escape of the hot gases may be of any suitable kind, for instance as illustrated in the United States Patent 2,666,633 to Gustav Bojner.

Figure 1:
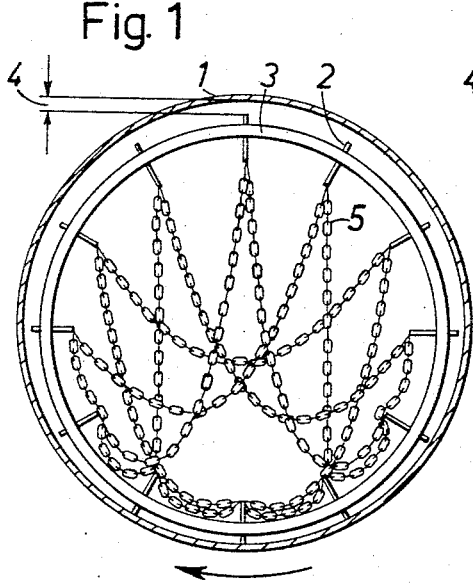
FIG. 1 is a transversal cross-section through a drum of a kiln with a rolling cage for suspending the chain system and FIG. 2 is a corresponding fractional longitudinal section, both figures according to one of said embodiments.
Figure 2:
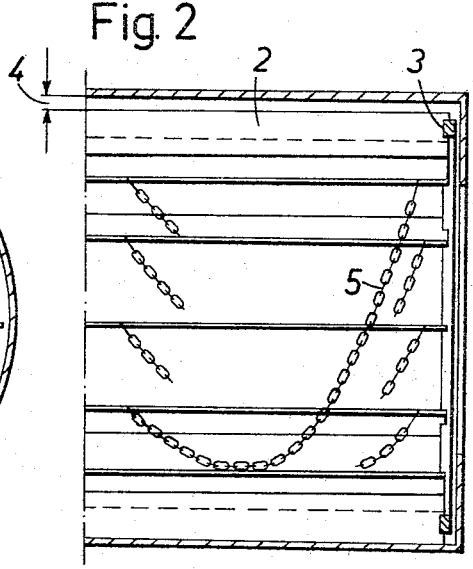

The rolling cage as shown in FIGS. 1 and 2, consists of the longitudinally extending sheet metal plates or flat-iron bars 2 which are disposed edgewise against the envelope wall and which at each end of the drum are mutually connected by an annular member 3, for instance by welding, so that a structural unit is formed. As clearly shown by the measure indication 4, the cage 2, 3 has a rolling diameter considerably smaller than the inner diameter of the drum, so that the cage will roll slightly more than one revolution for each revolution of the drum. Consequently, the bars 2 constituting the lines of contact with the drum, are progressively displaced over the envelope wall of the drum according to the rotation of the same, said bars thereby maintaining the envelope wall in a clean condition. It should be observed that in this embodiment the cage can be said to constitute a rolling polygon with a great number of sides or angle corners. The chains 5 are suspended in the cage by attaching certain links of the chains to the bars 2 of the cage by welding or other suitable means.

In case the material to be treated is fairly thick or has the consistency of a free-flowing sludge, the bars 2 will scoop the material falling through the drum while contacting the chains, whereby both a direct and an indirect exchange of heat is attained. Most of the chains will simultaneously hang in curves, but evidently they will in a certain location progressively lie on the bottom position of the drum. As they always will be in a bending movement the chain links cannot be enclosed by sticky coatings. In the drawing, only few chains of the actual great number are shown and the chains are also shown too spaced, but the general arrangement should be clear to every expert. The closer the chains, the better the transfer of heat from the gases.

Figure 3:
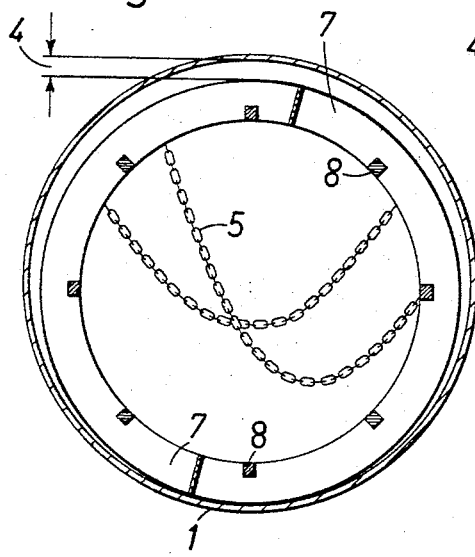
FIGS. 3 and 4 illustrate the other embodiment in similar transversal and longitudinal sections.
Figure 4:
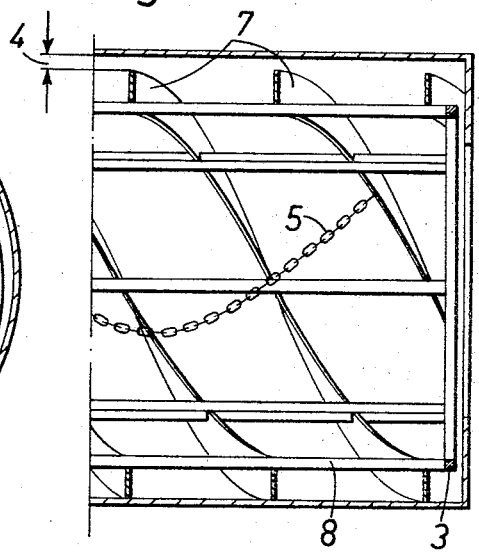

According to FIGS. 3 and 4, the chains 5 are also suspended in a cage rolling freely in the envelope wall 1 of the rotating drum. However, in one aspect there is an important difference between the rolling cage in FIG. 1 and the rolling cage in FIG. 3. Whereas according to FIGS. 1 and 2, the straight plates or bars 2 constitute a polygon having straight longitudinal lines of contact with the envelope wall, the rolling cage in FIGS. 3 and 4 is formed of a double helix which consists of edgewise disposed flat iron-bars or strips 7, whereby two helical lines of contact with the envelope wall are obtained. These two helical bars or strips 7 are interconnected to form one structural unit by means of longitudinally extending bars 8 which are attached to the helical bars or strips 7 by welding or other suitable means, and are also interconnected by an annular member 3 at each end. As the case is in FIGS. 1 and 2, also the helical bars 7 have a rolling diameter, which is substantially smaller than the inner diameter of the drum or kiln, so that the lines of contact are progressively displaced. This difference between the diameters is indicated by the measure 4, as in FIGS. 1 and 2. As to the construction of the cage in accordance with FIGS. 3 and 4 it should especially be observed that this rolling cage is particularly advantageous in as much as this cage also serves as an effective advancing device for materials, which require a positive feeding and are not entirely fluid or liquid.

In both embodiments the rolling cage is guided with respect to the axial direction, viz, the cage is guided between the annular end wall sections of the drum, as appearing from FIGS. 2 and 4.

The invention can also be utilized in connection with rotating drums for condensing vapours conveyed through a drum supplied with water, and for washing exhaust or flue gas containing dust or similar matter.

Modifications of the structure of the rolling cage are possible and the chains can be attached and suspended in other ways than illustrated in the drawing.

I claim:

1. An apparatus for the treatment of materials including:
  (a) a drum rotatable about a generally horizontal axis, said drum having an interior surface defining an inner chamber through which said material is passed,
  (b) a cage in said chamber rotatable about an axis generally parallel to the axis of rotation of said drum and spaced therefrom, said cage includes an open framework defining an interior space, said framework having means thereon defining surfaces for sliding engagement with the interior surface of said drum in rolling lines of contact to thereby remove material adhered to any portion of said interior surface, said surfaces of said cage defining a rolling diameter less than the rolling diameter of the interior surface of said drum,
  (c) a plurality of chains connected to said cage, each of said chains being suspended from spaced points on said open framework and traversing said interior space within said framework, each of said chains including a draped portion engageable in rolling lines of contact with the interior surface of said drum through said open framework.

2. An apparatus as recited in claim 1 wherein said surface defining means on said framework defines a plurality of circumferentially spaced, longitudinally extending surfaces.

3. An apparatus as recited in claim 1 wherein said surface defining means on said framework defines at least one surface extending axially and circumferentially about said framework in a helical manner.

4. An apparatus as recited in claim 1 wherein the interior surface of said drum is slightly inclined toward the axis of rotation of said drum so that the chamber defined thereby has a varying diameter axially.

5. An apparatus as recited in claim 2 wherein said surface defining means on said framework consists of circumferentially spaced, longitudinally extending sheet metal plates disposed edgewise relative to the interior surface of said drum in a radial-like pattern.

6. An apparatus as recited in claim 1 wherein said surface defining means consists of at least one helically extending sheet metal bar disposed edgewise relative to the interior surface of said drum.

References Cited

UNITED STATES PATENTS

| | | | |
|---|---|---|---|
| 1,957,138 | 5/1934 | Hasselbach | 263—33 |
| 3,142,546 | 7/1964 | Coats | 34—142 |

FOREIGN PATENTS 616,463   7/1935   Germany.

FREDERICK L. MATTESON, Jr., *Primary Examiner.*

JOHN J. CAMBY, *Examiner.*